Dec. 4, 1934.  C. W. FLETCHER ET AL  1,982,732
TUBE COUPLING
Filed July 12, 1929

C. W. Fletcher
and R. H. Stone  INVENTORS
BY
Thomas Howe  ATTORNEY

Patented Dec. 4, 1934

1,982,732

UNITED STATES PATENT OFFICE 1,982,732

TUBE COUPLING

Charles W. Fletcher, New York, N. Y., and R. Harry Stone, Irvington, N. J., assignors to Titeflex Metal Hose Co., a corporation of New Jersey Application July 12, 1929, Serial No. 377,723

6 Claims. (Cl. 285—74)

This invention relates to tube couplings and more particularly for flexible tubing of either the seamless or helically disposed strip type. Tubing of this latter nature is shown in the patent to Brinkman 1,198,392, patented September 12, 1916. More particularly the invention relates to couplings arranged to be cast in place.

One of the greatest difficulties heretofore met in the use of flexible metallic tubing is difficulty in adapting couplings for its use. This is due to the uneven surfaces presented, both inside and outside such tubes. This difficulty is often aggravated by the use of flexible braided coverings and the like for protecting the tube or preventing rotation of the seam convolutions.

It is therefore an object of this invention to provide a simple and effective means and method for coupling flexible metallic tubing to standard coupling devices having screw threads or otherwise.

Another object of this invention is to provide a coupling device at the end of a flexible metallic tubing which is composed of material which when melted readily adheres to the surface of the flexible tube.

A further object is to provide a coupling for the ends of metallic tubes consisting of a unitary coupling device having no packing or other weakened portions wherein leakages are likely to occur.

A still further object is to provide a coupling for flexible metallic tubing of unitary construction having extension both outside and inside the metallic tubing without other seams or joints therebetween.

A still further object is to provide a cast coupling element for metallic tubing especially of the flexible type.

A still further object is to provide a coupling for metallic tubing having a braided metallic covering thereon, to prevent rotation of the tube elements as well as to protect the outer surface of the tube.

Further and more definite objects will appear from the following specification, claims and drawing in which Figure 1 shows a coupling attached to a metallic tubing of the nature indicated combined within the apparatus for forming such coupling;

Figure 1:
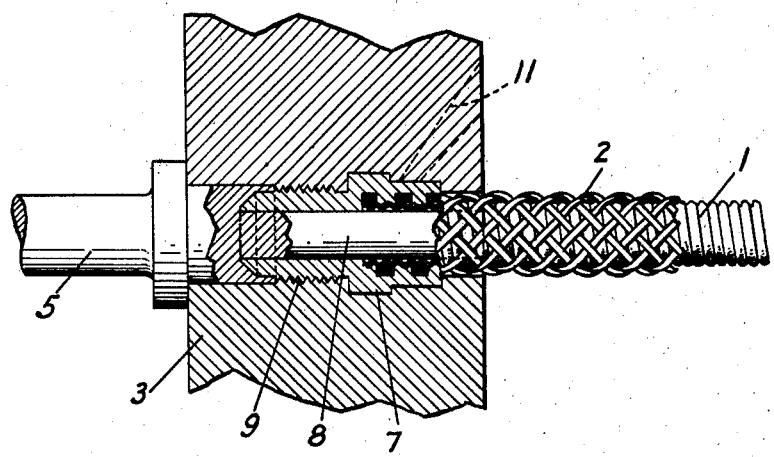

Referring now more particularly to the drawing, the flexible, metallic, corrugated, tubing 1 may be of a seamless type or of the type constructed of helically disposed strip having adjacent convolutions interlocked, wherein flexibility is imparted to the movement of the corrugation sides, or it may be of the type using a packing in the joints which permits sliding. In order to protect the outer surface of the tube and to prevent rotation of the different parts of the tube one with respect to the other, a braided stranded metal or other covering 2 may be applied to the tube throughout its length, the strands extending helically about the tube and being adapted to be secured to the couplings at the ends.

The tube with or without the covering 2 may be inserted within the mold 3 which is split or otherwise arranged to permit ready removal of the tube after the coupling has been cast thereon.

This mold 3 has a core or plug element 5 associated therewith to form the ends of the coupling device 7. It is also provided with an inner projecting core element 8 extending into the tube 1 at least as far as it is desired that the coupling 7 shall extend upon the outside. It may extend further if it is desired. As shown it extends the full length of the mold 3. The inner surface of the mold 3 may be arranged with a threaded portion 9 to form threads upon the coupling 7 when it is molded. In order to fill the mold a pouring duct 11 is arranged on the surface of the mold which is adapted to be uppermost. The core piece 8 need not closely fit the inner surface of the tube 1 but a slight space may be permitted therebetween in order to allow the material of the casting to flow up between the tube and the core. The core may have a rim or flange at its end, which closely fits the inside of the tube so as to limit the flow of metal inwardly of the tube beyond the end of the core. This will form an even and fluid tight joint between the ends of the tubing and the coupling device which will not be readily susceptible to leakage. Also the molten metal (as lead) when poured into the mold will adhere to the surface of the tubing 1 and also to any braided metallic material which is arranged upon the outside so as to form a firm and rigid joint with them, holding the parts in the exact relation desired without the use of complicated machine operation or other manipulation.

After the poured material has sufficiently cooled the mold 3 may be separated and the core element 5 removed, furnishing a coupling upon the end of the tubing 1 of such construction that it is not subject to leakage or accidental removal as in the case of previous couplings of this nature. It also serves to hold the parts of the ends of the tubing in rigid relation in a condition which is least susceptible to leakage. The material of the coupling may be of any desired substance such as lead, copper, brass or other low melting point metals or alloys. It is necessary that the couplings have a lower melting point than that of the tubing so that the tubing will not be melted when the coupling is poured into the mold.

It is also apparent that even though there may be inaccuracies at points where the coupling metal fails to adhere to the tubing nevertheless the fact that integral parts of the coupling extend both within and without the tubing, regardless of the contraction or expansion of the tubing with relation to the coupling, such parts will always remain in fluid tight relation, because upon expansion of the tubing the outer surface of the coupling will be pressed into engagement therewith, whereas upon contraction of the tubing the inner portion of the coupling will be forced into close contact with it. This provides a close fit between the parts at all times.

Figure 2:
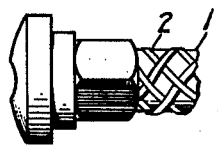
Fig. 2 shows another form of coupling which may be utilized in connection with this type of tubing.
Figure 3:
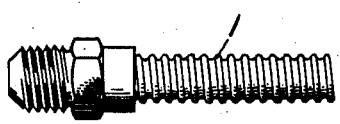
Fig. 3 shows the same type of coupling connected to seamless or integrally formed, corrugated tubing.

Other forms of tubing and couplings may be readily utilized in connection with the invention herein, such being shown in Figs. 2 and 3, in which Fig. 2 shows a disk type coupling molded directly onto the tubing and Fig. 3 shows the same type of coupling, previously indicated, connected to the seamless type of tubing. The features of cooperation between the parts in both cases are substantially the same, even though there is no outside protecting braided covering.

Figure 4:
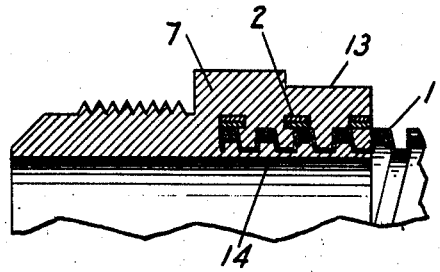
Fig. 4 shows a cross sectional view indicating in more detail the arrangement of the coupling parts in connection with the tubing.

The inner and outer portions 13 and 14, respectively of the coupling are more clearly shown in connection with the enlarged detailed view shown at Fig. 4. Here, it is apparent that there are no seams or joints adjacent the end of the tubing and that the coupling presents a uniform smooth surface inside throughout the extent of the coupling, thereby reenforcing the tube and preventing leakage as previously explained.

Other modifications might be utilized in connection herewith and it is not intended to be limited by the exact description and disclosure set forth. Having thus described our invention and particularly set forth the features thereof, what we desire to claim is:

1. A coupling for flexible metallic tubing comprising an exterior metal portion having the metal molded to the outside surface of said tube and an integral interior metal portion having the metal molded to the inside surface of said tube.

2. In a coupling for flexible metallic tubing, said tubing being constructed of a corrugated metal enclosure and a woven stranded metal covering, a coupling member composed of metal having a lower melting point than that of the corrugated enclosure, and molded thereon in a mold having a central core for extending into the tubing an appreciable distance whereby the molded metal coats the inside surface of the tube within the mold, said molded metal contacting with the said covering and said tube and interlocking therewith.

3. In a tube coupling, a corrugated flexible metal tube, a metal coupling molded to the external corrugations of said tube having a metal portion molded to the inner corrugations and extending inside said tube substantially throughout the length of the coupling.

4. In a tube coupling, a corrugated flexible metal tube, a stranded woven metal covering theron, a metal coupling molded thereon having a portion extending inside said tube substantially throughout the length of the coupling, said inside portion being molded to the tube.

5. The combination with a flexible metallic corrugated tube having a stranded woven metal covering and a metal coupling member comprising a metal portion molded to the external corrugations of said tube the molded metal embedding and interlocking with said covering and an integral metal portion molded into the internal corrugations and extending inside the tube substantially throughout the length of the coupling said external portion having a threaded part molded therewith.

6. The combination with a flexible metallic corrugated tube formed of a helically disposed strip the edges of which are secured together by means of a fluid tight immovable seam, said tube having a stranded woven metal covering for preventing damage to said seams, and a metal coupling member comprising a metal portion molded to and contacting with the external corrugations of said tube the molded metal embedding and interlocking with said covering and an integral metal portion molded into the corrugations inside said tube and extending substantially throughout the length of the coupling.

CHARLES W. FLETCHER.
R. HARRY STONE.